Feb. 26, 1924.
N. R. WILLIAMSON
TIRE CARRIER
Filed March 12, 1923
1,485,355
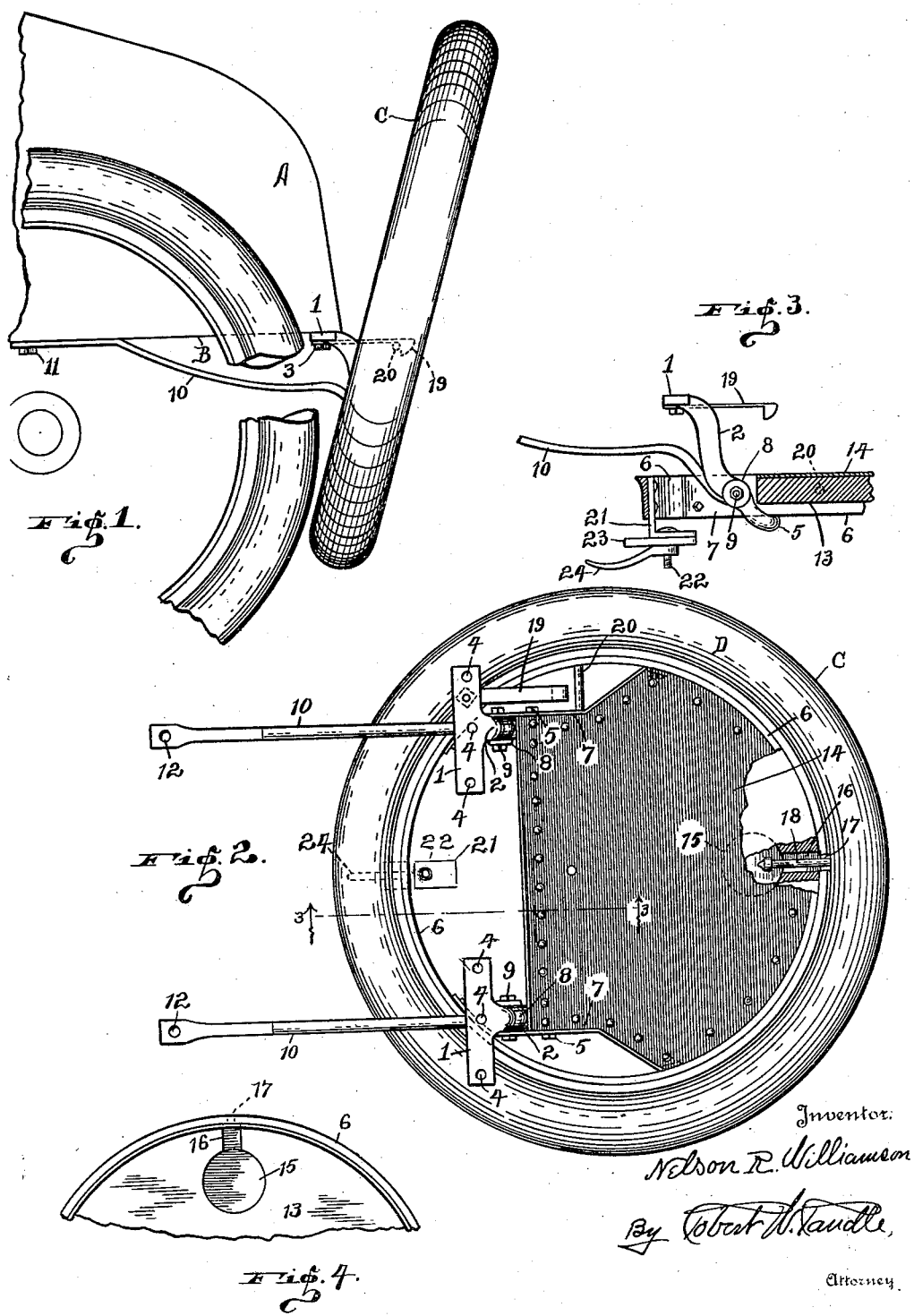

Patented Feb. 26, 1924.

1,485,355

UNITED STATES PATENT OFFICE.

NELSON R. WILLIAMSON, OF PORTLAND, INDIANA.

TIRE CARRIER.

Application filed March 12, 1923. Serial No. 624,410.

*To all whom it may concern:*

Be it known that I, NELSON R. WILLIAMSON, a citizen of the United States, residing in the city of Portland, in the county of Jay, State of Indiana, have invented a new and useful Tire Carrier, of which the following is a full, clear, and comprehensive specification and exposition, the same being such as will enable others to make and use the same with exactitude.

The object of my present invention, broadly speaking, is to provide a tire carrier for vehicles, the same being strong and durable in construction, simple in character, positive in action, easily operated and controlled, which will not be unsightly in appearance, adapted to be used for a plurality of purposes, and which can be manufactured and sold at a comparatively low price.

More particularly stated, my object is to provide a tire holder or carrier especially intended to be attached to the rear end of an automobile to carry an inflated spare tire, and at the same time it may be used as a luggage carrier, either without or in addition to the spare tire; and it may also be used to support and carry a trunk, or a box, or the like; or in addition to carrying a spare tire it is adapted to be used as a rear step, this last named feature being especially for vehicles having a rear door, such as ambulances or other commercial vehicles.

Other objects and particular advantages of the invention will be brought out in the course of the following description, and that which is new will be correlated in the appended claims.

In the drawings Figure 1 is a side elevation of a portion of an automobile, showing my invention in connection therewith, the invention being shown in raised or substantially upright position.

Figure 2 is a top plan view of the invention, showing the same in lowered or extended substantially horizontal position.

Figure 3 is a detail elevation, partly in section, of a portion of the invention.

Figure 4 is a rear or underside elevation of the upper portion of a part of the construction.

Similar indices denote like parts throughout the several views.

In order that the construction, the operation, and the several advantages of the invention may be more fully understood and appreciated, I will now take up a detailed description thereof in which I will set forth the same as fully and clearly as I may.

Referring now to the drawings in detail: Letter A denotes the rear portion of an automobile, the same has an underside or bottom B which is substantially horizontal. Letter C denotes the spare tire of an automobile, and D denotes the detachable rim on which said tire is mounted in the usual manner.

Two hangers are provided, which are identical with each other, each comprising a plate 1, and a stem 2, the plate and the stem being integral with each other. The plates 1 are adapted to be secured to the underside of the bottom B of the vehicle, and near the rear end thereof, by means of bolts 3 disposed through apertures 4 formed through the plates 1.

The stems 2 project downward and rearward from their respective plates 1, as shown in Fig. 3, and integral with the lower ends thereof there is formed an outturned lug 5 at right-angles thereto, for the purpose hereinafter stated.

Numeral 6 denotes the fixed annular supporting ring, or endless band. Attached to the inner periphery of the ring 6 are two supporting plates 7 whose main portions are parallel with each other, as shown in Fig. 2, with their minor portions disposed at an angle, both of the ends of each being rigidly secured to the ring 6 by rivets or otherwise.

A short distance upward from the lugs 5 horizontal bearings 8 are formed integral with their respective stems 2. Pivot bolts 9 are disposed through said bearings and through the supporting plates 7, whereby the ring 6 is hinged to said hangers, as shown.

Formed integral with the central portions of the stems 2 are the brace-arms 10, which extend forward and upward with their forward ends secured to the bottom B as by bolts 11 disposed through the apertures 12.

Numeral 13 denotes a platfrom or step, which in this instance is covered with rubber matting 14 on its upper side, as indicated.

Said platform is secured to the inner face of the rim 6 and the plates 7, filling the space therebetween.

In the rear or underside of the member 13, and near the upper rear edge thereof, a cavity 15 is formed which cavity has a branch or channel 16 extending therefrom out to the ring 6, which latter registers with a stem-aperture 17 formed through the ring 6. The purpose of this arrangement is to permit the stem 18 of the tire C to extend through the branch 16 into the cavity 15 where it will be accessible for injecting air therethrough into the tire.

Extending back from the bottom B, or any other suitable part of the body A, is a spring catch 19 which when the device is turned upward, as in Fig. 1, will engage the cross-bar 20 and hold the tire in its upward position, for instance as in Fig. 1.

Said cross-bar 20 is secured between the ring 6 and one of the plates 7, being located near the bend of the plate 7 as in Fig. 2, said bar being rigidly secured to said parts.

At the lower extremity of the ring 6, directly opposite the stem 18, an angular bracket 21 is secured to the inner face of said ring with its free end portion extending centerward of said ring, and it has a bolt aperture therethrough to receive therein the bolt 22. Said bolt 22 also extends through the plate 23, which latter projects outward to engage the rim of the tire which surrounds the said ring. A lever-nut 24 is threaded on the bolt 22 whereby the plate 23 may be clamped upon the rim to retain the tire in place.

Operation: In practice the plates 1 are bolted to the underside of the vehicle body, as are also the arms 10, and the spring catch 19, in the positions substantially as shown in Fig. 1.

It is now evident that when the tire C is in its normal position as usually carried, as is shown in Fig. 1, that the rim D will fit around on the ring 6 in the usual manner, whereby it may be removed or replaced when desired by simply loosening the lever-nut 24 and the plate 23, which will permit the tire and its rim to swing outward at the bottom, after which it may be lifted up, to remove the stem 18, which manifestly will free the tire from the carrier.

The tire being secured in place in the carrier, it is evident that when one so desires he may simply press upward on the rear end of the catch 19 which will release the bar 20 and thereby permit the tire, the rim, together with the ring 6 and the step 13, to turn downward, on the pivots 9, to horizontal position, as in Figs. 2 and 3. When in this position the device, either with or without the tire C thereon, forms a step, or a trunk or other baggage may be carried thereon.

It will be apparent that as the device assumes horizontal position that the lower edges of the plates 7 will come into contact with the stationary lugs 5 which are carried by the stems 2 with which they are integral, thereby preventing the device from swinging down beyond horizontal or other predetermined position.

When not desired to be used as a step or luggage carrier it is evident that by lifting upward on the rear upper portion of the tire, or the ring 6, that the device will turn to the position in which it is shown in Fig. 1, where it will automatically be secured by reason of the catch engaging the bar 20, where it will be retained as long as desired, or until the catch is sprung upward.

It is evident that various accessories, such as a tail-lamp, a license-plate et cet., may be attached and carried by the rear or underside of the step 13, which of course will be exposed when the step is up, but which will be out of the way when the step is down.

I desire that it be understood that various changes may be made in the several details of construction from that herein shown and described without departing from the spirit of the invention and without sacrificing any of the advantages thereof which are new and useful and which involve invention.

Having now fully shown and described my invention, what I claim and desire to secure by Letters Patent of the United States, is—

1. A tire carrier comprising a pair of relatively stationary hanger brackets extending from a vehicle body, a ring, a pair of plates secured to the inner periphery of said ring, means for pivotedly connecting said brackets to said parallel plates, lugs carried by said brackets and adapted to engage the lower edge of the ring when the ring is turned on said pivots to substantially horizontal position, a step member located within said ring, and means for holding the ring up out of horizontal position.

2. A device of the nature set forth, including a step, means for hinging the step to a vehicle whereby it may be turned up or down, means for supporting the step when it is in substantially horizontal position, means for detachably retaining the step in up turned position, and means for detachably retaining a tire and its rim around said step.

3. A device of the nature set forth comprising a step, a ring surrounding the step, means for hinging said ring to brackets, means for securing the brackets to a vehicle, brace arms connecting said brackets to a vehicle, and means for detachably connecting an inflated vehicle tire to said ring.

4. A combined tire or luggage carrier and vehicle step, including a tire carrying ring adapted to have an inflated tire detachably secured therearound, a step member secured within the curvature of the ring, means for hinging the ring to a vehicle body whereby it may swing up and down between substantially vertical and horizontal positions, means for supporting the ring at a predetermined limit of movement downward, and means for detachably securing the ring at its upper limit of movement.

In testimony whereof I have hereunto subscribed my name to this specification.

NELSON R. WILLIAMSON.